US012055835B2

(12) United States Patent
Lopez Mendez et al.

(10) Patent No.: US 12,055,835 B2
(45) Date of Patent: Aug. 6, 2024

(54) APPARATUS AND METHOD OF FOCUSING LIGHT

(71) Applicant: Arm Limited, Cambridge (GB)

(72) Inventors: Roberto Lopez Mendez, Cambridge (GB); Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/484,490

(22) Filed: Sep. 24, 2021

(65) Prior Publication Data

US 2023/0115678 A1 Apr. 13, 2023

(51) Int. Cl.
*G02F 1/29* (2006.01)
*G06F 3/01* (2006.01)

(52) U.S. Cl.
CPC .............. *G02F 1/294* (2021.01); *G06F 3/013* (2013.01)

(58) Field of Classification Search
None
See application file for complete search history.

(56) References Cited

U.S. PATENT DOCUMENTS

| | | | |
|---|---|---|---|
| 10,979,685 B1* | 4/2021 | Silverstein | H04N 13/117 |
| 2010/0226000 A1* | 9/2010 | Sasaki | G02B 27/0068 |
| | | | 359/315 |
| 2010/0321377 A1* | 12/2010 | Gay | G06T 19/00 |
| | | | 345/419 |
| 2014/0132629 A1* | 5/2014 | Pandey | G06T 11/001 |
| | | | 345/633 |
| 2014/0181678 A1* | 6/2014 | Louchheim | G06F 3/04815 |
| | | | 715/738 |
| 2017/0068134 A1* | 3/2017 | Yadin | G02F 1/134309 |
| 2017/0293145 A1* | 10/2017 | Miller | G02C 11/10 |
| 2019/0302881 A1* | 10/2019 | Chan | G06F 3/013 |
| 2021/0330185 A1* | 10/2021 | Krukowski | A61B 3/028 |
| 2021/0382371 A1* | 12/2021 | Ni | G02F 1/2955 |
| 2022/0382064 A1* | 12/2022 | Rohn | G02B 1/002 |
| 2022/0408030 A1* | 12/2022 | Ollila | G02B 3/14 |

* cited by examiner

*Primary Examiner* — Nicholas J Lee
(74) *Attorney, Agent, or Firm* — Leveque Intellectual Property Law, P.C.

(57) ABSTRACT

There is provided a display apparatus to focus light for a user. The apparatus comprises a tuneable lens having controllable optical properties, an eye-tracker device to determine a position at which the user is looking, and circuitry to control the optical properties of the tuneable lens to bring an object at the depth of the position into focus for the user. A method of focusing light is also provided. The method comprises determining a position at which the user is looking and controlling optical properties of a tuneable lens to bring an object at the depth of the position into focus for the user.

17 Claims, 6 Drawing Sheets

APPARATUS AND METHOD OF FOCUSING LIGHT

BACKGROUND

The present techniques relate to apparatus and methods of focusing light. The techniques may be useful for focusing light in virtual, augmented, mixed, and extended reality applications, also known as VR, AR, MR, and XR respectively.

Lenses for focusing light, such as those in use in glasses and in electronic devices such as virtual reality headsets, are made of dense materials which must be accurately machined and have focusing abilities which are difficult to change once machined. As a consequence, lenses are expensive, and electronic devices containing lenses are bulky, heavy, and cannot compensate for users who do not have perfect vision.

BRIEF DESCRIPTION OF THE DRAWINGS

The present techniques are diagrammatically illustrated, by way of example, in the accompanying drawings, in which.

DETAILED DESCRIPTION

According to a first technique there is provided a display apparatus to focus light for a user, comprising: a tuneable lens having one or more controllable optical properties; an eye-tracker device to determine a position at which the user is looking; and circuitry to control the one or more optical properties of the tuneable lens to bring an object at the depth of the position into focus for the user.

According to a second technique there is provided a method of focusing light, comprising: determining a position at which the user is looking; and controlling one or more optical properties of a tuneable lens to bring an object at the depth of the position into focus for the user.

According to a third technique there is provided a non-transitory computer-readable storage medium, comprising executable instructions thereon which, if executed by a processor, cause the processor to carry out the steps of the second technique.

Broadly speaking, embodiments of the present techniques provide for an improved user experience. Some embodiments address the vergence-accommodation conflict where in some electronic devices, such as smart phones, tablets, and head-mounted devices such as virtual reality headsets, augmented reality glasses, smart glasses, and holographic headsets and visors, images are generated and displayed to a user either on a screen or by way of reflection from a screen. The screen, which in some instances may include a display or monitor, in question is a fixed and relatively small distance from the user's eyes relative to the apparent distances of displayed objects. The user, when focusing on a virtual object being shown on the screen, is focusing on an object which is being displayed to appear further from the user than the screen is, but the lenses of the user's eyes are actually focusing on light coming from the nearby screen. As the user tries to focus on the object at its perceived depth, the user's eyes rotate to focus on the object, but the object remains out of focus because it is at a different depth than the perceived depth, specifically at a depth equal to the distance from the eyes to the screen. Consequently, the user's brain must deal with a mismatch of information received from the eyes: the lenses are focusing strongly as they focus on light from the nearby screen, but the eyes are actually pointed as if the object at which the user is looking is further away than the screen. This is the vergence-accommodation conflict, which may result, in extreme cases, in nausea, dizziness and disorientation.

Figure 1:
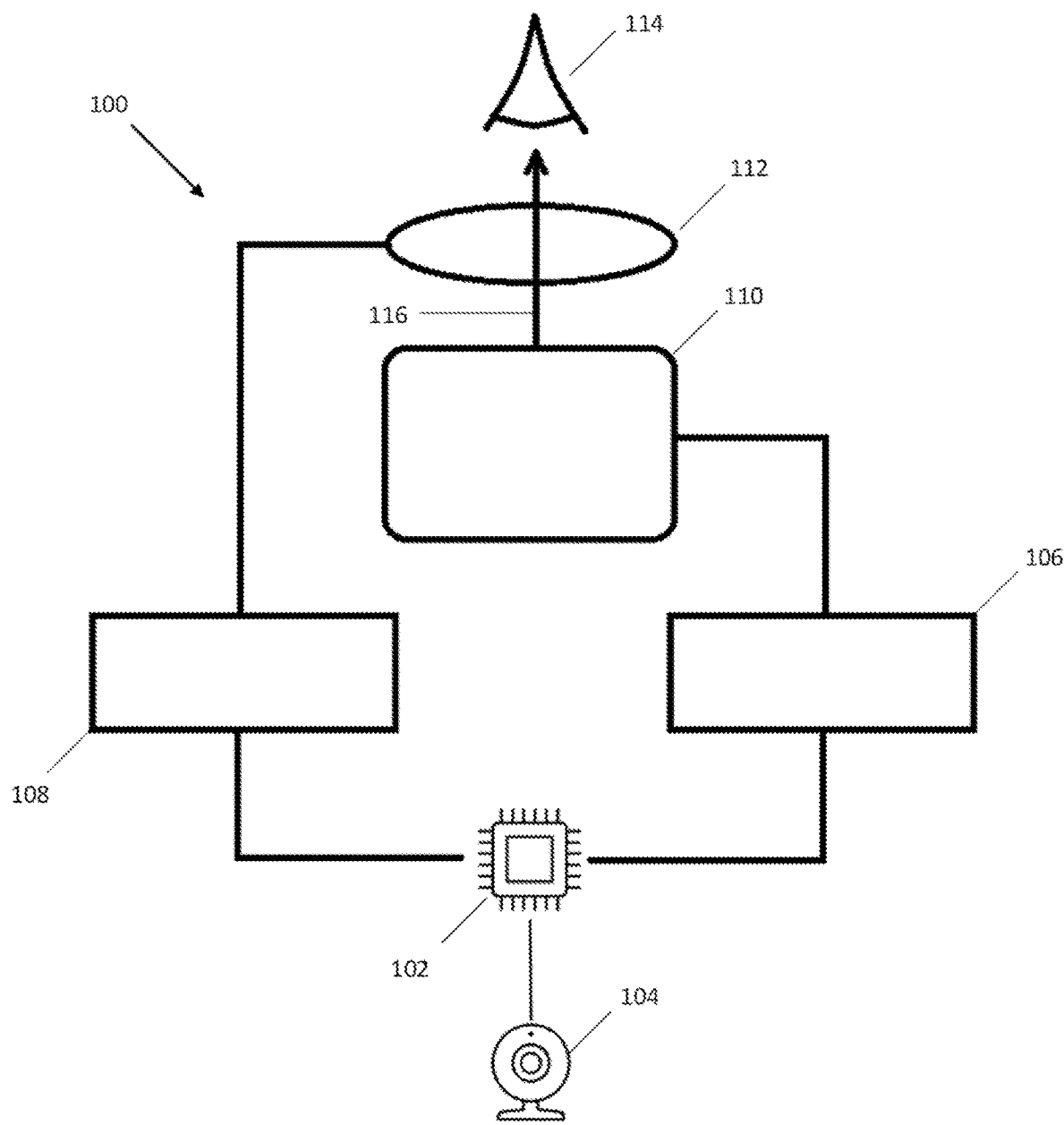
FIG. 1 schematically shows a virtual reality apparatus according to an embodiment.

Referring to FIG. 1, an apparatus 100 is shown comprising a processor element 102 (hereafter "processor"). Such a processor may be, for example, a central processor unit (CPU), graphics processor unit (GPU), a system-on-chip, an application specific integrated circuit (ASIC), a neural processing unit (NPU), a DSP (digital signal processor), or the like. The processor may comprise and/or be in communication with a storage system (not shown). In embodiments the storage system may comprise, for example, volatile memory (e.g. SRAM, DRAM, etc.) and/or non-volatile memory (e.g. flash memory, non-volatile RAM, etc.). The apparatus may include more than one processor 102.

Apparatus 100 further comprises an eye-tracker device 104. Such an eye-tracker device 104 may include one or more cameras which receive light reflected by the user's eyes from, for example, the environment. Such an eye-tracker device 104 may additionally or alternatively include one or more optical sensors, such as infrared or near-infrared sensors, which shine light at the user's eyes and receive light subsequently reflected from the user's eyes. From the reflected light, a determination can be made of the positions and orientations of the user's eyes. From the positions and orientations, it may be determined, for example by calculation using geometry, where the user is looking. Additionally or alternatively to the aforementioned one or more optical sensors, the eye-tracker device 104 may include a photo detector and a micro-electromechanical system (MEMS) to track the user's eyes, which uses less power than optical sensors. The positions and orientations of the user's eyes may be used by the processor 102 in a determination of eye vergence, from which the processor 102 may calculate a depth of an object at which the user is looking.

Apparatus 100 further comprises a display controller 106 and a lens controller 108 in communication with the processor 102.

Apparatus 100 further comprises a display screen 110. Such a display screen 110 may include a liquid crystal display (LCD), a light emitting diode (LED) display, an organic light emitting diode (OLED) display, an active matrix organic light emitting diode (AMOLED) display, and the like.

Apparatus 100 further comprises a tuneable lens 112. The tuneable lens 112 has optical properties which define how light interacts with the tuneable lens 112. Examples of optical properties include refractive index, transparency, reflectance, and the like.

The tuneable lens 112 may include one or more metalenses. A metalens comprises a metamaterial whose optical properties are controllable, locally (i.e. across a minority of the metamaterial), or globally (i.e., across the whole or majority of the metamaterial), by the application of electrical current and/or thermal energy to the metamaterial to cause the metamaterial to interact with incident light and/or light passing through the metamaterial. In an example, the metamaterial is a broadband, transparent, optical phase change material which bends light passing through it by an amount proportional to the applied current and/or thermal energy.

Where the optical properties of the metalens are globally controllable, the apparatus may comprise a heating device operable to heat the metalens, thereby controlling the optical properties of the metalens in accordance with the heat supplied. Alternatively, the heating device may be external to the apparatus.

Where the optical properties of the metalens are locally controllable, the metalens may comprise control circuitry throughout, whereby the current and/or thermal energy to be applied to each local area of the metalens can be delivered. Further, where the optical properties of the metalens are locally controllable, multiple (i.e., more than one) objects at different distances from a user may be brought into focus simultaneously by adjusting the optical properties of different areas of the metalens corresponding to where light from the multiple objects passes through the metalens. Additionally, or alternatively, the optical properties of the metalens may be locally controllable such that one or more objects is brought into focus while one or more further objects is made to be out of focus. In an embodiment where the tuneable lens 112 comprises one or more metalenses, the control circuitry is connected to or is a component of the lens controller 108.

The optical properties of the metalens may be locally controllable by the shining of an infrared beam onto the metalens. The infrared beam may be focused to control the optical properties of one or more parts of the metalens in accordance with an amount of thermal energy supplied to those parts by the infrared beam. The infrared beam may be controlled by the lens controller 108.

A user 114 of the apparatus 100 is also shown to illustrate a path that light 116 from the screen 110 takes to the user's eyes 114. The apparatus 100 may form part of a virtual reality headset wearable on a user's head such that the user's vision is generally encapsulated by a boundary around the screen 110.

The processor 102 instructs the display controller 106 to render images for display on the screen 110. The images may be, for example, images of a virtual reality environment comprising objects of the environment, such as walls, trees, furniture, and the like. The images may be rendered by a graphics component of the processor 102 or they may be rendered by a dedicated GPU (not shown) that may be considered a component of the display controller or a separate piece of hardware in communication therewith.

The processor 102 receives eye data from the eye-tracker device 104. The eye data may include data relating to a sensed position and orientation of one or both of a user's eyes. The processor 102 determines, based on or in response to the received eye data, a position on the screen 110 at which the user 114 is looking. The determination may include determining a value of eye vergence.

The processor 102 determines, based on or in response to the determined position, a displayed virtual object or part thereof at which the user 114 is looking. For example, it may be determined that the user is looking at a trunk of a tree in the virtual environment. The processor 102 receives, from, for example, the storage system, a depth of the object, such as the tree trunk. In embodiments, a depth buffer is provided in the storage system from which the processor receives the depth of the object. The depth of the object corresponds to a virtual distance from the user 114 to the object. For example, if the storage system indicates a depth value of the tree trunk to be a particular distance (e.g. three meters), the distance from the user's eyes to the tree trunk may be determined to be three metres plus an offset distance, where the offset distance is the distance from the user's eyes to the screen 110. Additionally, or alternatively, the depth can be determined from the eye vergence. Notably, when determining depth of a position at which a user is looking, it is not required to determine whether an object is at the position to determine depth using eye vergence, as the calculation of depth is performed geometrically rather than with reference to the object.

The processor 102, given the depth of the object at which the user is looking, determines, based on the depth, the optical properties of the tuneable lens 112 required to bring the object into focus for the user and instructs the lens controller 108 to adjust the optical properties of the tuneable lens 112 to have the determined optical properties and thereby bring the object at which the user is looking into focus for the user. For example, having been provided or having determined the relative arrangement of the screen 110, the tuneable lens 112, and the user's eyes 114, the processor 102 determines what portion of the tuneable lens 112 is to have its optical properties adjusted to bring the object into focus for the user 114, and to what extent the optical properties are to be adjusted, and instructs the lens controller 108 to effect the adjustment.

For example, if an object at which the user is looking is at a central location of the screen 110, and the object is determined to be a particular distance (e.g. two metres) from the user 114, the processor 102 may determine that a central portion of the tuneable lens 112 is to be tuned (i.e., to have its optical properties changed) to increase its refractive index by a particular amount proportional to the determined distance to the object.

Alternatively to determining both a portion of the tuneable lens 112 to adjust and an extent to which the optical properties of the tuneable lens 112 are to be adjusted, only the extent to which the optical properties are to be adjusted may be determined and the adjustment applied by the lens controller 108 across the whole tuneable lens 112. In other words, the adjustment may be applied globally. This brings all objects at a depth corresponding to the adjusted optical properties into focus for the user 114. This reduces the complexity of control circuitry required to adjust the optical properties of the tuneable lens 112 while still bringing the object at which the user is looking into focus.

In an embodiment, having determined the location and depth of the object at which the user 114 is looking, the apparatus 100 may bring that object into focus by adjusting the optical properties of the tuneable lens 112 in the manner described above and additionally defocus other objects in proportion to the difference between their depths and the depth of the object in focus. This mimics the user's visual experience in reality, where objects in the user's peripheral vision naturally defocus in this way. To do this, the depths of the other objects are obtained, such as received from a storage system. The differences between those depths and the depth of the in-focus object are determined, and the optical properties of areas of the tuneable lens 112 adjusted in proportion to the determined differences. For example, if the user 114 is looking at a tree trunk a particular distance (e.g. three metres) away, and there is a car a further distance (e.g. four metres) away and a wall a still further distance (e.g. five metres) away, the trunk is brought into focus, the car is made to be out of focus, and the wall made to be more out of focus than the car. This proportional defocusing mimics the visual reality of the human experience and mitigates or eliminates the negative effects of the vergence-accommodation conflict in virtual reality.

In an embodiment, the processor 102 of the apparatus 100 may be operable to determine the depth of a position at which the user is looking using a determination of the user's eye vergence and/or receiving depth data, as described above, instruct the display controller 106 to display on the screen 110 one or more objects at that depth, determine optical properties of the tuneable lens 112 required to bring the objects at that depth into focus for the user 114, and instruct the lens controller 108 to adjust the optical properties of the tuneable lens 112 to have the determined optical properties and thereby bring the objects at that depth into focus. The one or more objects so displayed may be kept in focus as the determined depth changes so that the objects are always in focus. The objects in this case may be, for example, objects of a heads-up display (HUD), notifications, alerts, and the like. The objects being brought into focus may therefore include objects which are not at the position at which the user is looking, but, for example, around a periphery of the user's vision.

Figure 2:
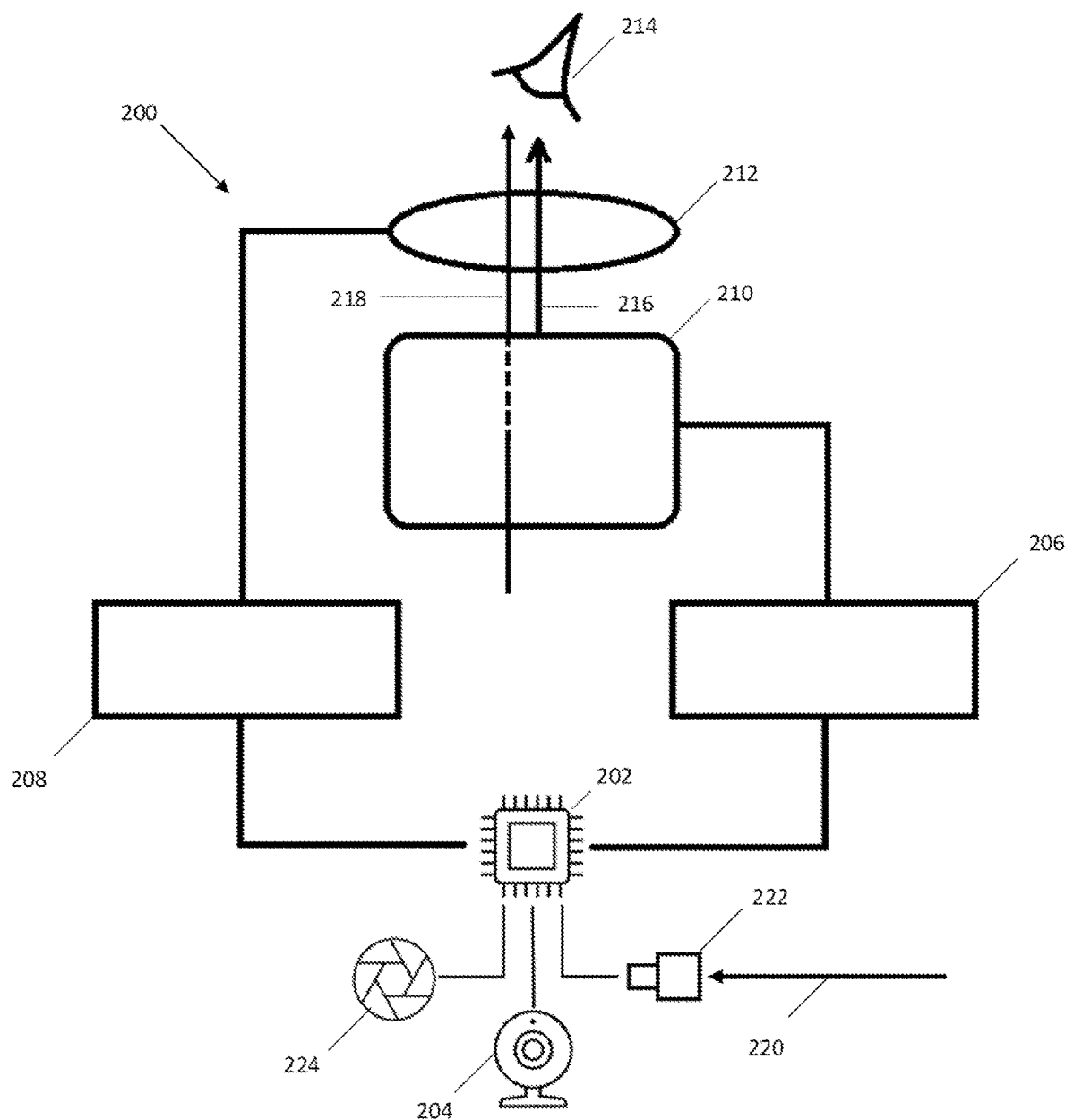
FIG. 2 schematically shows an augmented reality apparatus according to an embodiment.

Referring to FIG. 2, an apparatus 200 is shown. Features of apparatus 200 which are similar to those of apparatus 100 are given reference numerals equal to those given for apparatus 100 increased by 100.

Apparatus 200 is shown comprising a processor 202. Such a processor 202 may be, for example, a central processor unit (CPU), graphics processor unit (GPU), a system-on-chip, an application specific integrated circuit (ASIC), a neural processing unit (NPU), a DSP (digital signal processor), or the like. The processor may comprise and/or be in communication with a storage system (not shown). The processor may comprise and/or be in communication with a storage system (not shown). In embodiments the storage system may comprise, for example, volatile memory (e.g. SRAM, DRAM, etc.) and/or non-volatile memory (e.g. flash memory, non-volatile RAM, etc.). The apparatus may include more than one processor element.

Apparatus 200 further comprises an eye-tracker device 204. Such an eye-tracker device 204 may include one or more cameras which receive light reflected by the user's eyes reflected from, for example, the environment. Such an eye-tracker device 204 may additionally or alternatively include one or more optical sensors, such as infrared or near-infrared sensors, which shine light at the user's eyes and receive light subsequently reflected from the user's eyes. From the reflected light, a determination can be made of the positions and orientations of the user's eyes. From the positions and orientations, it may be determined, for example by calculation using geometry, where the user is looking. Additionally or alternatively to the aforementioned one or more optical sensors, the eye-tracker device 204 may include a photo detector and a micro-electromechanical system (MEMS) to track the user's eyes, which uses less power than optical sensors. The positions and orientations of the user's eyes may be used by the processor 202 in a determination of eye vergence, from which the processor 202 may calculate a depth of an object at which the user is looking.

Apparatus 200 further comprises a display controller 206 and a lens controller 208 in communication with the processor 202.

Apparatus 200 further comprises a display screen 210. Such a display screen 210 may include a liquid crystal display (LCD), a light emitting diode (LED) display, an organic light emitting diode (OLED) display, an active matrix organic light emitting diode (AMOLED) display, and the like.

Apparatus 200 further comprises a tuneable lens 212. Such a tuneable lens 212 may include one or more metalenses. In an embodiment where the tuneable lens 212 comprises one or more metalenses, the control circuitry is connected to or is a component of the lens controller 208.

Where the optical properties of the metalens are globally controllable, the apparatus may comprise a heating device operable to heat the metalens, thereby controlling the optical properties of the metalens in accordance with the heat supplied. Alternatively, the heating device may be external to the apparatus.

Where the optical properties of the metalens are locally controllable, the metalens may comprise control circuitry throughout, whereby the current and/or thermal energy to be applied to each local area of the metalens can be delivered. Further, where the optical properties of the metalens are locally controllable, multiple (i.e., more than one) objects at different distances from a user may be brought into focus simultaneously by adjusting the optical properties of different areas of the metalens corresponding to where light from the multiple objects passes through the metalens. Additionally, or alternatively, the optical properties of the metalens may be locally controllable such that one or more objects is brought into focus while one or more further objects is made to be out of focus. In an embodiment where the tuneable lens 212 comprises one or more metalenses, the control circuitry is connected to or is a component of the lens controller 208.

The optical properties of the metalens may be locally controllable by the shining of an infrared beam onto the metalens. The infrared beam may be focused to control the optical properties of one or more parts of the metalens in accordance with an amount of thermal energy supplied to those parts by the infrared beam. The infrared beam may be controlled by the lens controller 208.

Apparatus 200 further comprises a depth sensor 222. Such a depth sensor 222 may include one or more of a passive infrared (PIR), lidar, or radar sensor, in which cases the depth sensor 222 transmits light into the environment and receives light 220 reflected by the environment, including light 220 reflected by an object at which the user 214 is looking. The depth sensor 222 may include two or more sensors (for example, two cameras) for parallax-type determination of depth, in which case the depth sensor 222 does not have to shine light into the environment. Here, the light being transmitted and received by the depth sensor 222 may include visible light, or it may include electromagnetic radiation outside of the visible spectrum, such as infrared light, ultraviolet light, or radio waves.

Apparatus 200 further comprises a camera 224 for receiving light 218 from the environment. Such a camera 224 may be operable to receive light in the visible spectrum and/or to receive light outside the visible spectrum, such as infrared and ultraviolet light. The function of the camera is described below.

A user 214 of the apparatus 200 is also shown to illustrate a path that light 216 from the screen 210 takes to the user's eyes 214. The apparatus 200 may form part of a pair of glasses, helmet/visor, or similar wearable device such that the user's view of their surroundings is mostly or totally unobstructed, the screen 210 being transparent or semi-transparent so that the user can both receive light 218 from the real environment through the screen 210 and see images displayed on the screen 210.

The processor 202 instructs the display controller 206 to render images for display on the screen 210. The images may be, for example, images of one or more virtual objects, each having respective virtual depths, that overlie, combine with, or augment the real environment. The virtual objects are displayed at their respective virtual depths. For example, the images may be location or directional information forming part of a navigational application, or they may be images of characters of a computer game with which the user can interact. The images may be rendered by a graphics component of the processor 202, or they may be rendered by a graphics processing unit (not shown) that may be considered a component of the display controller or a separate piece of hardware.

The processor 202 receives eye data from the eye-tracker device 204. The eye data may include data recording positions and orientations of a user's eyes 214. The processor 202 determines, from the received eye data, either a position on the screen 210 or a position in the real environment at which the user 214 is looking. The processor 202 may also determine a value of eye vergence.

If it is determined that the user 214 is looking at a virtual object on the screen, the processor 202 determines, from the position on the screen, a displayed virtual object or part thereof at which the user 214 is looking. For example, it may be determined that the user 214 is looking at a directional arrow in the virtual environment. In this case, the processor 202 receives, from, for example, a storage system (not shown), a depth of the object. In embodiments, a depth buffer is provided in the storage system from which the processor receives the depth of the object. The depth of the object corresponds to a virtual distance from the user 214 to the object. For example, if the storage system indicates a depth value of the directional arrow to be three meters, the distance from the user's eyes to the arrow may be determined to be three metres and an offset distance, where the offset distance is the distance from the user's eyes 214 to the screen.

In the case where it is determined that the user is looking at an object in the real environment, the processor 202 queries a depth sensor 222 for depth data representing a distance from the depth sensor 222 to the object in the real environment.

In either of the two above cases, the depth may additionally or alternatively be determined from the eye vergence. Notably, when determining depth of a position at which a user is looking, it is not required to determine whether an object is at the position to determine depth using eye vergence, as the calculation of depth is performed geometrically rather than with reference to the object.

The processor 202, on determining from the depth data received from the storage system, obtained from the depth sensor 222, and/or from the eye vergence the depth of the object at which the user is looking, instructs the lens controller 208 to adjust the optical properties of the tuneable lens 212. Determining the relative arrangement of the screen 210, the tuneable lens 212, and the user's eyes 214, the processor 202 determines what portion of the tuneable lens 212 is to have its optical properties adjusted to bring the object, such as the arrow, into focus for the user 214, and to what extent the optical properties are to be adjusted, and instructs the lens controller 208 to effect the adjustment.

For example, if an object at which the user is looking is at a central location of the screen 210, and the object is determined to be a particular distance (e.g. five metres) from the user 214, the processor 202 may determine that a central portion of the tuneable lens 212 is to be tuned (i.e. to have its optical properties changed) to increase its refractive index by a particular amount to bring the object into focus proportional to the determined distance to the object.

Alternatively to determining both a portion of the tuneable lens 212 to adjust and an extent to which the optical properties of the tuneable lens 212 are to be adjusted, only the extent to which the optical properties are to be adjusted may be determined, and the adjustment applied by the lens controller 208 across the whole tuneable lens 212. In other words, the adjustment may be applied globally. This brings all objects at a depth corresponding to the adjusted optical properties into focus for the user 214.

In the case where it is determined that the user is looking at a position which overlaps a real object and a virtual object, depth information obtained from the depth sensor 222 and depth data received from the storage system may be combined by the processor 202 to determine how to focus the tuneable lens 212. In one embodiment, a determination may be made by the processor 202, in accordance with an indication defined by one or more predetermined criteria, as to which of the virtual object and real object is most "relevant", and, based on the determination, the processor 202 then instructs the lens controller 208 to adjust the optical properties of the tuneable lens 212 and thereby cause the tuneable lens to focus on object determined to be most relevant. For example, predetermined criteria may indicate that, when it has been determined that the user is looking at a position that overlaps a real object and a virtual object, the virtual object is to be taken to be the most relevant and thus its being brought into focus is to be prioritized. The processor may query the storage system to receive the predetermined criteria from the storage system. The predetermined criteria may define, for example, an indication that the virtual object is to be prioritized, an indication that the real object is to be prioritized, an indication that the larger object is to be prioritized, an indication that the smaller object is to be prioritized, an indication that the closer object is to be prioritized, and an indication that the farther object is to be prioritized. In another embodiment, an average of the depths of the real and virtual objects may be determined and used as the basis for adjusting the optical properties of the tuneable lens 212. In another embodiment, where the optical properties of the tuneable lens 212 are locally controllable, both the real and virtual objects may be brought into focus by adjusting the optical properties of different areas of the tuneable lens 212 corresponding to where light from the two objects passes through the tuneable lens 212.

When rendering a virtual object overlapping a real object, it is possible that artifacts will be visible near the virtual and real object. If artifacts would be visible, an object segmentation procedure may be used to segment and classify objects of the environment. Having segmented and classified the objects of the environment, silhouettes of the objects are identified. Analysing the silhouettes allows any artifacts that are generated to be more easily identified and removed from the rendered scene.

Where a depth is received or obtained, the processor 202 may additionally or alternatively determine the depth using the value of eye vergence.

The processor 202 may be operable to compare depth data received from the depth sensor 222 with a depth determined from a user's eye vergence before determining how to control the optical properties of the tuneable lens 212.

In an embodiment, the user 214 may be looking through a real and partially or totally transparent object, such as a window, at an object (which may be a real object or a virtual object in this case). Depth data from the depth sensor 222 may indicate that the object at the position at which the user is looking is the window, but the eye vergence indicates that the user 214 is looking at an object which is further away from the user than the depth sensor 222 indicates. To avoid wrongly controlling the tuneable lens 212 to bring the window into focus for the user 214, the processor 202 compares the depth data received from the depth sensor 222 with the depth determined from the user's eye vergence, determines a discrepancy between the two depths (i.e., determines that the two depths are not the same within a predetermined margin of error), and uses the eye vergence depth to determine the optical properties of the tuneable lens 212 necessary to bring the farther object into focus for the user 214.

In an embodiment, the user 214 may be looking at a surface of a partially or totally transparent virtual object, such as a virtual window. The virtual window is displayed on the screen 210 and is transparent or partially transparent such that the user can see through the virtual window to see other objects, including other virtual objects and real objects. The depth sensor 222 cannot detect the presence of a virtual object, so indicates that the user 214 is looking at a real object farther away from the user 214 than the virtual window. However, the eye vergence indicates that the user 214 is looking at an object which is closer to the user than the depth sensor 222 indicates. To avoid wrongly controlling the tuneable lens 212 to bring the distant object into focus for the user 214, the processor 202 compares the depth data received from the depth sensor 222 with the depth determined from the user's eye vergence, determines a discrepancy between the two depths, i.e., determines that the two depths are not the same within a predetermined margin of error, and uses the eye vergence depth to determine the optical properties of the tuneable lens 212 necessary to bring the virtual window into focus for the user 214.

In either of the above embodiments where the processor 202 determines a discrepancy between the depth indicated by the depth sensor 222 and the depth determined from eye vergence, the processor 202 may receive depth data of the object at the position at which the user is looking from the storage system and compare the received depth data with the depth determined from the eye vergence. If the received depth data and the depth determined from the eye vergence are determined to be equal, i.e., determined to be within a predetermined margin of each other, or a difference between the two is determined to be smaller than a predetermined value, this indicates that the user is looking at a virtual object and the processor 202 uses the depth data received from the storage system rather than the depth determined from eye vergence to determine the necessary optical properties to bring the virtual object into focus for the user 214.

In an embodiment, having determined the location and depth of the object at which the user 214 is looking, the apparatus 200 may bring that object into focus by adjusting the optical properties of the tuneable lens 212 in the manner described above and additionally defocus other objects in proportion to the difference between their depths and the depth of the object in focus. To do this, the depths of the other objects are obtained, such as received from the storage system and/or obtained from the depth sensor. The difference between those depths and the depth of the in-focus object is determined, and the optical properties of areas of the tuneable lens 212 adjusted in proportion to the determined differences. For example, if the user 214 is looking at a real tree trunk at a particular distance (e.g. three metres away), and there is a virtual character behind the tree, a real car at a further distance (e.g. four metres) away and another virtual character at a still further distance (e.g. five metres away), the trunk and any visible part of the first virtual character are brought into focus, the car is made to be out of focus, and the second virtual character made to be more out of focus than the car. This proportional defocusing mimics the visual reality of the human experience and mitigates or eliminates the negative effects of the vergence-accommodation conflict in augmented reality. In another embodiment, a determination may be made that the car is a real object, and no adjustment of the tuneable lens 212 may therefore be performed for the car. This may be the case if the user's vision is already sufficient, that is if the user does not require adjustment of the tuneable lens 212 to account for their prescription.

In an embodiment, the apparatus 200 comprises a camera 224 which receives light from the environment and provides environment data representative of objects in the environment to the processor 202. The processor 202 determines, given the environment data, how to position and orient an object to be rendered such that the object appears to interact with objects of the environment as a real object. In an example, where the object to be rendered is a computer game character, the environment data may indicate a tree at a particular distance (e.g. two metres) from the user 214. The character to be rendered in this example is approximately the same distance from the user 214. The processor 202 determines from the environment data that, in reality, the character would be partially or fully occluded by the tree. The processor 202 then determines the appropriate portion of the character that is visible (if any), and instructs the display controller 206 to display the visible portion of the character as if the character were partially or fully hidden behind the tree. In an embodiment, the processor 202 compares a depth of the real object (e.g., tree) from the depth sensor 222 and a depth of the virtual object (e.g., video game character) from the storage system, determines from the comparison which of the real object and virtual object is closer to the user, and if the virtual object is closer, the processor 202 instructs the display controller 206 to display the virtual object. If the processor 202 determines that a part of the virtual object is farther away than a real object, then the processor may not instruct the display controller 206 to display that part of the virtual object because it is occluded by the real object. In this way, only parts of virtual objects that are not occluded by real objects are rendered and displayed to the user, which provides a realistic illusion of the virtual objects interacting with the real environment.

Alternatively, rather than the screen 210 being transparent or semi-transparent such that light 218 from the environment passes through the screen, the screen may instead be opaque and the apparatus 200 comprise a camera (not shown) for capturing light 218 from the environment and converting the captured light into images of the environment for display on the screen 218 together with any virtual objects.

In an embodiment, the processor 202 of the apparatus 200 may be operable to determine the depth of a position at which the user is looking using a determination of the user's eye vergence and/or depth data received from the storage system and/or depth from the depth sensor 222, as described above, instruct the display controller 206 to display on the screen 210 one or more objects at that depth, determine optical properties of the tuneable lens 212 required to bring the objects at that depth into focus for the user 214, and instruct the lens controller 208 to adjust the optical properties of the tuneable lens 212 to have the determined optical properties and thereby bring the objects at that depth into focus. The one or more objects so displayed may be kept in focus as the determined depth changes so that the objects are always in focus. The objects in this case may be, for example, objects of a heads-up display (HUD), notifications, alerts, and the like. The objects being brought into focus may therefore include objects which are not at the position at which the user is looking, but, for example, around a periphery of the user's vision.

Figure 3:
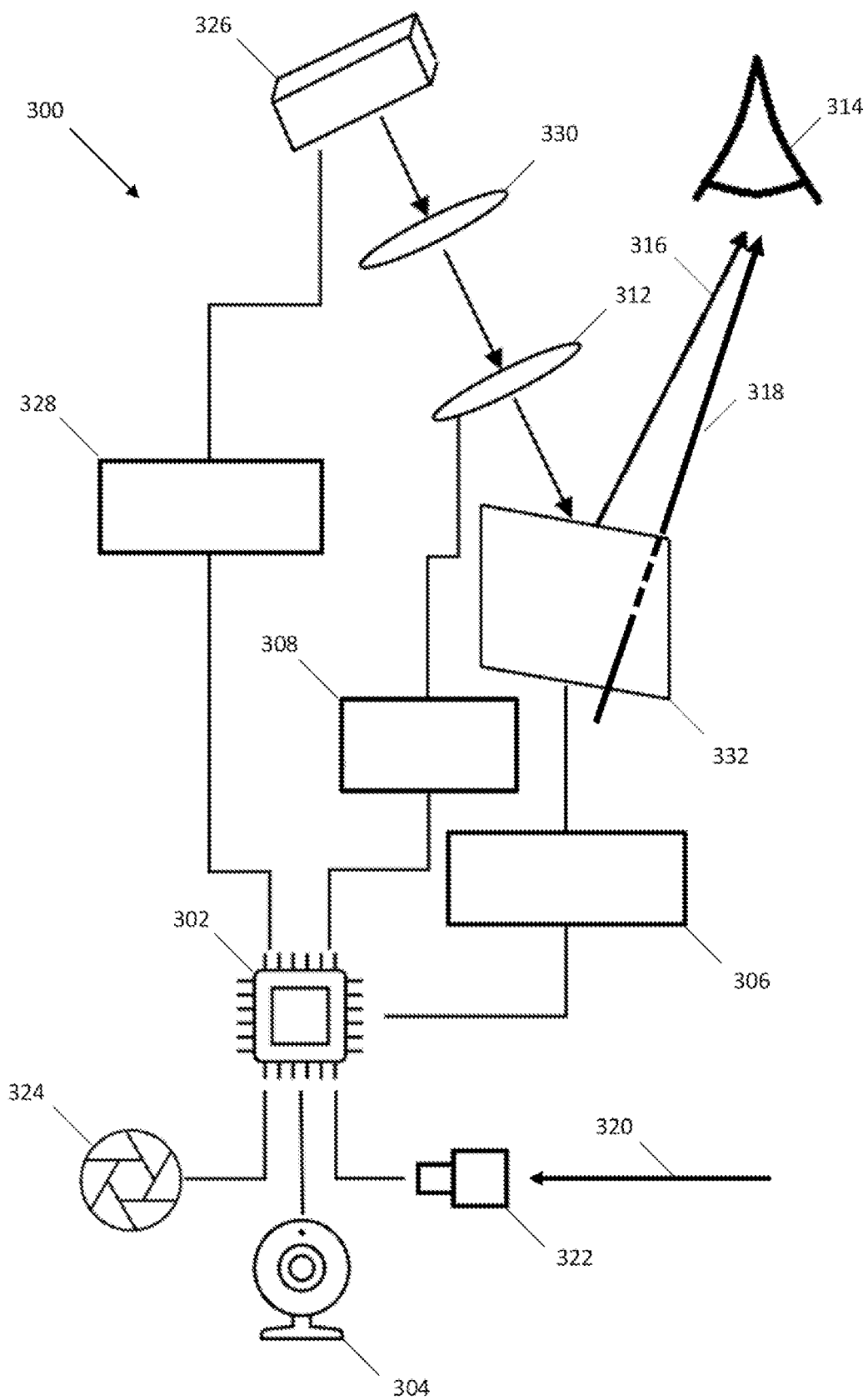
FIG. 3 schematically shows a holographic apparatus according to an embodiment.

Referring to FIG. 3, an apparatus 300 is shown. Features of apparatus 300 which are similar to those of apparatus 100 are given reference numerals equal to those given for apparatus 100 but increased by 200, and features of apparatus 300 which are similar to those of apparatus 200 are given reference numerals equal to those given for apparatus 200 but increased by 100.

Apparatus 300 is shown comprising a processor 302. Such a processor 302 may be, for example, a central processor unit (CPU), graphics processor unit (GPU), a system-on-chip, an application specific integrated circuit (ASIC), a neural processing unit (NPU), a DSP (digital signal processor), or the like. The processor may comprise and/or be in communication with a storage system (not shown). The processor may comprise and/or be in communication with a storage system (not shown). In embodiments the storage system may comprise, for example, volatile memory (e.g. SRAM, DRAM, etc.) and/or non-volatile memory (e.g. flash memory, non-volatile RAM, etc.). The apparatus may include more than one processor element.

Apparatus 300 further comprises an eye-tracker device 304. Such an eye-tracker device 304 may include one or more cameras which receive light reflected by the user's eyes. Such an eye-tracker device 304 may additionally or alternatively include one or more optical sensors, such as infrared or near-infrared sensors, which shine light at the user's eyes and receive light subsequently reflected by the user's eyes. From the light reflected by the user's eyes and received by the eye-tracker device 304, a determination can be made of the positions and orientations of the user's eyes. From the positions and orientations, it may be determined, for example by calculation using geometry, where the user is looking. Additionally or alternatively to the aforementioned one or more optical sensors, the eye-tracker device 304 may include a photo detector and a micro-electromechanical system (MEMS) to track the user's eyes, which uses less power than optical sensors. The positions and orientations of the user's eyes may be used by the processor 302 in a determination of eye vergence, from which the processor 302 may calculate a depth of an object at which the user is looking.

Apparatus 300 further comprises a display controller 306, such as a micro-display controller, and a lens controller 308 in communication with the processor 302.

Apparatus 300 further comprises a tuneable lens 312. Such a tuneable lens 312 may include one or more metalenses. In an embodiment where the tuneable lens 312 comprises one or more metalenses, the control circuitry is connected to or is a component of the lens controller 308.

Where the optical properties of the metalens are globally controllable, the apparatus may comprise a heating device operable to heat the metalens, thereby controlling the optical properties of the metalens in accordance with the heat supplied. Alternatively, the heating device may be external to the apparatus.

Where the optical properties of the metalens are locally controllable, the metalens may comprise control circuitry throughout, whereby the current and/or thermal energy to be applied to each local area of the metalens can be delivered. Further, where the optical properties of the metalens are locally controllable, multiple (i.e., more than one) objects at different distances from a user may be brought into focus simultaneously by adjusting the optical properties of different areas of the metalens corresponding to where light from the multiple objects passes through the metalens. Additionally, or alternatively, the optical properties of the metalens may be locally controllable such that one or more objects is brought into focus while one or more further objects is made to be out of focus. In an embodiment where the tuneable lens 312 comprises one or more metalenses, the control circuitry is connected to or is a component of the lens controller 308.

The optical properties of the metalens may be locally controllable by the shining of an infrared beam onto the metalens. The infrared beam may be focused to control the optical properties of one or more parts of the metalens in accordance with an amount of thermal energy supplied to those parts by the infrared beam. The infrared beam may be controlled by the lens controller 308. Apparatus 300 further comprises a display 332. In the present illustrative embodiment, the display is a reflective spatial light modulator (SLM) display, but the claims are not limited in this respect and any suitable screen may be used.

Apparatus 300 further comprises a holographic light source 326. Such a holographic light source may include a laser light source, for example an RGB laser.

Apparatus 300 further comprises a holographic light source controller 328 in communication with the processor 302 and a beam expander 330 arranged between the holographic light source 326 and the tuneable lens 312.

A user 314 of the apparatus 300 is also shown to illustrate a path that light 316 from the display 332 takes to the user's eyes 314.

The apparatus 300 may form part of a pair of glasses, helmet/visor, or other wearable device such that the user's view of their surroundings is largely or totally unobstructed, the display 332 being transparent or semi-transparent so that the user can both receive light 318 from the real environment through the display 332 and see images reflected from the display 332.

The processor 302 instructs the holographic light source controller 328 to cause the holographic light source 326 to shine light through the beam expander 330 and the tuneable lens 312 onto the display 332. The beam expander 330 expands the cross-sectional area of the light beam and may be integrated or integrable into the holographic light source 326 itself. The processor 302 also instructs the display controller 306 to adjust the reflective properties of the display 332 such that the incident light beam reflects from the display 332 to form a wavefront 316 defining an image based on the reflective properties of the display 332. The user 314 perceives the reflected image as being displayed by the display 332.

The reflective properties required to generate a particular image can be determined using known methods such as fast Fourier transformation (FFT) or point-based computation (PBC). The images may be, for example, images of one or more virtual objects, each having respective virtual depths, that overlie, combine with, or supplement the real environment. For example, the images may be location or directional information forming part of a navigational application, or they may be images of characters of a computer game with which the user 314 can interact. The images may be rendered by a graphics component of the processor 302, or they may be rendered by a graphics processing unit (not shown) that may be considered a component of the display controller 306 or a separate piece of hardware.

The processor 302 receives eye data from the eye-tracker device 304. The eye data includes data recording positions and orientations of the user's eyes. The processor 302 determines, from the received eye data, either a position on the display 332 or a position in the real environment at which the user 314 is looking. The processor 302 may also determine a value of eye vergence.

If it is determined that the user 314 is looking at a virtual object, the processor 302 determines, from the position on the display 332, a displayed virtual object or part thereof at which the user 314 is looking. For example, it may be determined that the user 314 is looking at a computer game character in the virtual environment. In this case, the processor 302 receives, from, for example, a storage system (not shown), a depth of the character. In embodiments, a depth buffer is provided in the storage system from which the processor receives the depth of the object. The depth of the character corresponds to a virtual distance from the user 314 to the character. For example, if the storage system indicates a depth value of the directional arrow to be two meters, the distance from the user's eyes to the character may be determined to be two metres and an offset distance, where the offset distance is the distance from the user's eyes 314 to the display 332.

In the case where it is determined that the user 314 is looking at an object in the real environment, the processor queries a depth sensor 322 for depth data. The depth sensor 322 may include one or more of a passive infrared (PIR), lidar, or radar sensor, in which case the depth sensor 322 shines light into the environment and receives light 320 reflected by the environment, including light 320 reflected by the object at which the user 314 is looking. The depth sensor 322 may include two or more cameras for parallax-type determination of depth, in which case the depth sensor 322 does not have to shine light into the environment. Here, the light being transmitted and received by the depth sensor 322 may include visible light, or it may include light outside of the visible spectrum, such as infrared, ultraviolet, or radio waves.

In either of the two above cases, the depth may additionally or alternatively be determined from the eye vergence. Notably, when determining depth of a position at which a user is looking, it is not required to determine whether an object is at the position to determine depth using eye vergence, as the calculation of depth is performed geometrically rather than with reference to the object.

The processor 302, having received or determined the depth of the object at which the user is looking, instructs the lens controller 308 to adjust the optical properties of the tuneable lens 312. Determining the relative arrangement of the display 332, the tuneable lens 312, and the user's eyes 314, the processor 302 determines what portion of the tuneable lens 312 is to have its optical properties adjusted to bring the object into focus for the user 314, and to what extent the optical properties are to be adjusted, and instructs the lens controller 308 to effect the adjustment.

For example, if an object at which the user is looking, such as the game character, is perceived to be at a central location of the display 332, and the object is determined to be one metre from the user 314, the processor 302 may determine that a central portion of the tuneable lens 312 is to be tuned (i.e. to have its optical properties changed) to increase its refractive index by a an amount which brings light from the character one metre away into focus for the user. Increasing the refractive index of the central portion of the tuneable lens 312 causes light emitted by the holographic light source 326 and passing through the central portion of the tuneable lens 312 on its way to the display 332 to refract through a greater angle of refraction relative to changing the refractive index by a smaller amount. This alters the focus of the incident light beam on the display 332, and thus the nature of the reflected image, bring the one metre away, central, object into focus for the user 314.

Alternatively to determining both a portion of the tuneable lens 312 to adjust and an extent to which the optical properties of the tuneable lens 312 are to be adjusted, only the extent to which the optical properties are to be adjusted may be determined, and the adjustment applied by the lens controller 308 across the whole tuneable lens 312. In other words, the adjustment may be applied globally. This focuses the light passing through the tuneable lens 312 such that light 316 reflected from display 332 defining objects at a depth corresponding to the adjusted optical properties is brought into focus for the user 314.

In the case where it is determined that the user is looking at a position which overlaps two virtual objects, depth data from the storage system may be combined by the processor 302 to determine how to focus the tuneable lens 312. In one embodiment, a determination may be made by the processor 302, in accordance with predetermined criteria, as to which of the objects is most "relevant", and, based on the determination, the processor 302 then instructs the lens controller 308 to adjust the optical properties of the tuneable lens 312 and thereby cause the tuneable lens to focus the light such that the object determined to be most relevant is brought into focus for the user 314. For example, it may be predetermined that, when it has been determined that the user is looking at a position that overlaps two virtual objects, the closer virtual object is to be taken to be the most relevant and thus its being brought into focus is prioritized. The processor may query the storage system to receive the predetermination from the storage system. The predetermined criteria may include, for example, an indication that the larger object is to be prioritized, an indication that the smaller object is to be prioritized, an indication that the closer object is to be prioritized, and an indication that the farther object is to be prioritized. In another embodiment, an average of the two depths may be determined and used as the basis for adjusting the optical properties of the tuneable lens 312. In another embodiment, where the optical properties of the tuneable lens 312 are locally controllable, both objects may be brought into focus by adjusting the optical properties of different areas of the tuneable lens 312 corresponding to where light from the holographic light source 326, to be subsequently reflected by two different areas of the display 332, passes through the tuneable lens 312.

When rendering a virtual object overlapping a real object, it is possible that artifacts will be visible near the virtual and real object. If artifacts would be visible, an object segmentation procedure may be used to segment and classify objects of the environment. Having segmented and classified the objects of the environment, silhouettes of the objects are identified. Analysing the silhouettes allows any artifacts that are generated to be more easily identified and removed from the rendered scene.

In any circumstances above where a depth is received or obtained, the processor 302 may additionally or alternatively determine the depth using the value of eye vergence.

In an embodiment, the apparatus 300 comprises a camera 324 which receives light from the environment and provides environment data representative of objects in the environment to the processor 302. The processor 302 determines, given the environment data, how to position and orient an object to be rendered such that the object appears to interact with the environment as a real object. In an example, where the object to be rendered is a computer game character, the environment data may indicate a tree at a particular distance (e.g. two metres) from the user 314. The character to be rendered in this example is approximately the same distance from the user 314. The processor 302 determines from the environment data that, in reality, the character would be partially or fully occluded by the tree. The processor 302 then determines the appropriate portion of the character that is visible (if any), determines the appropriate reflective properties of the display 332, and instructs the display controller 306 to control the display 332 such that reflection of light from the display 332 causes the visible portion of the character to be displayed as if the character were partially or fully hidden behind the tree. In an embodiment, the processor 302 compares a depth of the real object (e.g., tree) from the depth sensor 322 and a depth of the virtual object (e.g., computer game character) from the depth buffer, determines from the comparison which of the real object and virtual object is closer to the user, and if the virtual object is closer, the processor 302 determines the appropriate reflective properties of the display 332 and instructs the display controller 306 to display the virtual object. If the processor 302 determines that a part of the virtual object is farther away than a real object, then the processor may not instruct the display controller 306 to render that part of the virtual object because it is occluded by the real object. In this way, only parts of virtual objects that are not occluded by real objects are rendered and visible to the user, which provides the illusion of the virtual objects interacting with the real environment.

In an embodiment, the processor 302 of the apparatus 300 may be operable to determine the depth of a position at which the user is looking using a determination of the user's eye vergence and/or depth data received from the storage system and/or depth from the depth sensor 322, as described above, instruct the display controller 306 to display on the screen 310 one or more objects at that depth, determine optical properties of the tuneable lens 312 required to bring the objects at that depth into focus for the user 314, and instruct the lens controller 308 to adjust the optical properties of the tuneable lens 312 to have the determined optical properties and thereby bring the objects at that depth into focus. The one or more objects so displayed may be kept in focus as the determined depth changes so that the objects are always in focus. The objects in this case may be, for example, objects of a heads-up display (HUD), notifications, alerts, and the like. The objects being brought into focus may therefore include objects which are not at the position at which the user is looking, but, for example, around a periphery of the user's vision.

It should be noted that the processor 102, 202, 302 of any above embodiment may instead be a computational system of separate components including a processor configurable in much the same way as the processor 102, 202, 302.

In alternative embodiments, the apparatus 100, 200, 300 may not comprise the processor 102, 202, 302 or similar computational processing hardware (such as a processor, memory, and/or graphics processing unit). In these respective alternative embodiments, the apparatus is instead communicatively connectable to a separate computer (not shown) which accepts eye data from the apparatus, carries out processing and rendering tasks on its own hardware, and passes rendered images ready for display to the apparatus. The connection over which eye data and rendered images are passed in this embodiment may be a wired connection, such as USB or Ethernet, or a wireless connection, such as Wi-Fi, or a combination of both a wired connection and a wireless connection. In an alternative embodiment, the apparatus may comprise the processor (or similar computation processing hardware), but still be communicatively connectable to the separate computer, such that the user can select which of the apparatus and the separate computer is to be used to perform the computational work.

Figure 4:
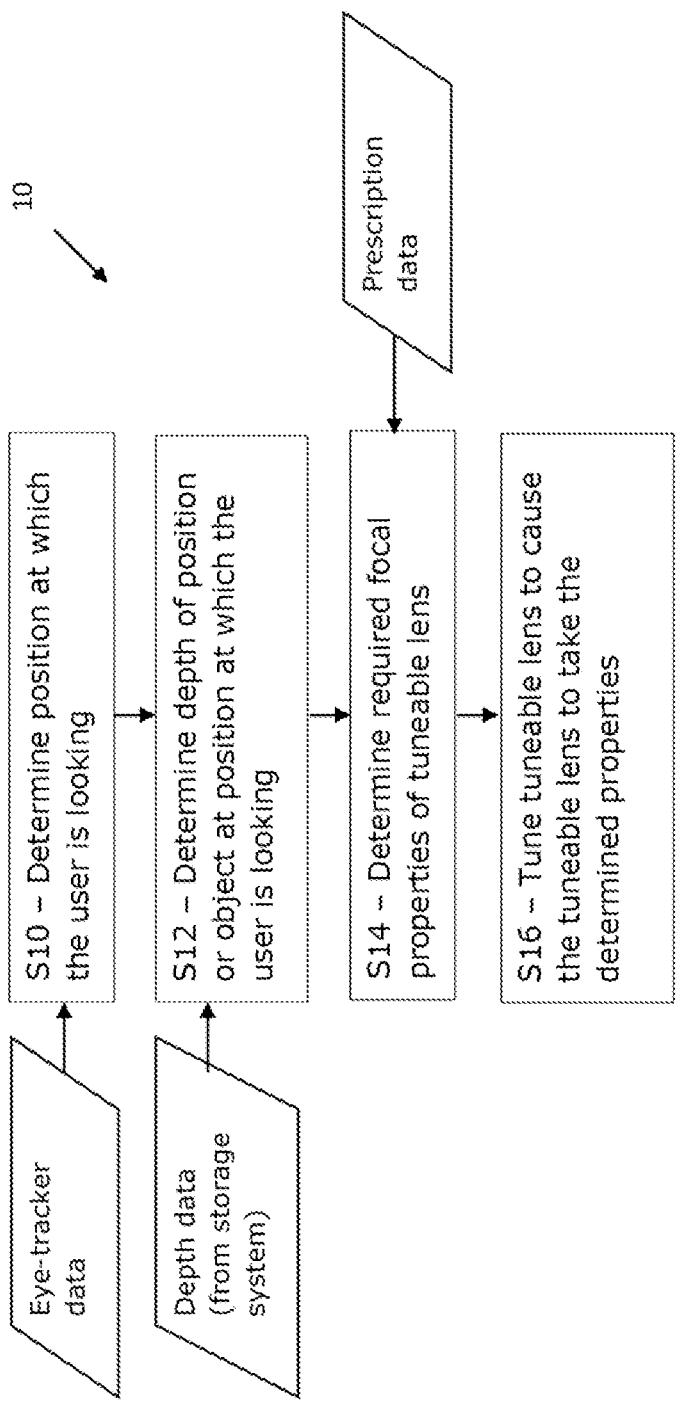
FIG. 4 is a flow diagram of steps according to an embodiment.

Referring to FIG. 4, a method 10 is shown with steps carried out by an apparatus such as apparatus 100. At step S10, processor 102 queries eye-tracker device 104 for eye-tracker data. With the eye-tracker data, which may indicate relative positions and orientations of the user's eyes 114, the processor 102 determines where the user is looking, i.e., determines the object at which the user is looking.

At step S12, the processor 102 receives depth data from a storage system, whereby the depth data indicates a depth of the object at which the user is looking in the virtual environment. Additionally, or alternatively, the processor 102 determines the depth from the eye vergence. The depth data may be received from a depth buffer of the storage system.

At step S14, having determined how far away the object at which the user is looking is from the user's eyes 114, the processor 102 determines the optical properties the tuneable lens 112 must take in order to refract light 116 from the display 110 such that an object at which the user is looking is brought into focus for the user 114. At this step, if the user has indicated that they have a prescription for their eyesight, then the processor 102 receives prescription data corresponding to the user's prescription from a prescription storage and takes the user's prescription into account when determining the optical properties of the tuneable lens 112. For example, if the user is myopic (to an extent quantifiably defined by the prescription data), then the tuneable lens 112 is controlled to refract light from the display 110 through a smaller angle than the tuneable lens 112 would be for a user without myopia, so that light passing through both the tuneable lens and the user's myopic lens would result in a sharp, focused image on the user's retina.

At step S16, the processor 102 instructs lens controller 108 to control the tuneable lens 112 to cause the tuneable lens 112 to take the determined properties. The processor 102 may instruct the lens controller 108 to control the tuneable lens 112 to cause the tuneable lens 112 to take the properties globally, i.e., across the whole or majority of the tuneable lens 112, or to take the properties locally, i.e., at a minority portion of the tuneable lens 112 required to bring the object at which the user is looking into focus such that one or more other portions may be tuned to take different properties.

Figure 5:
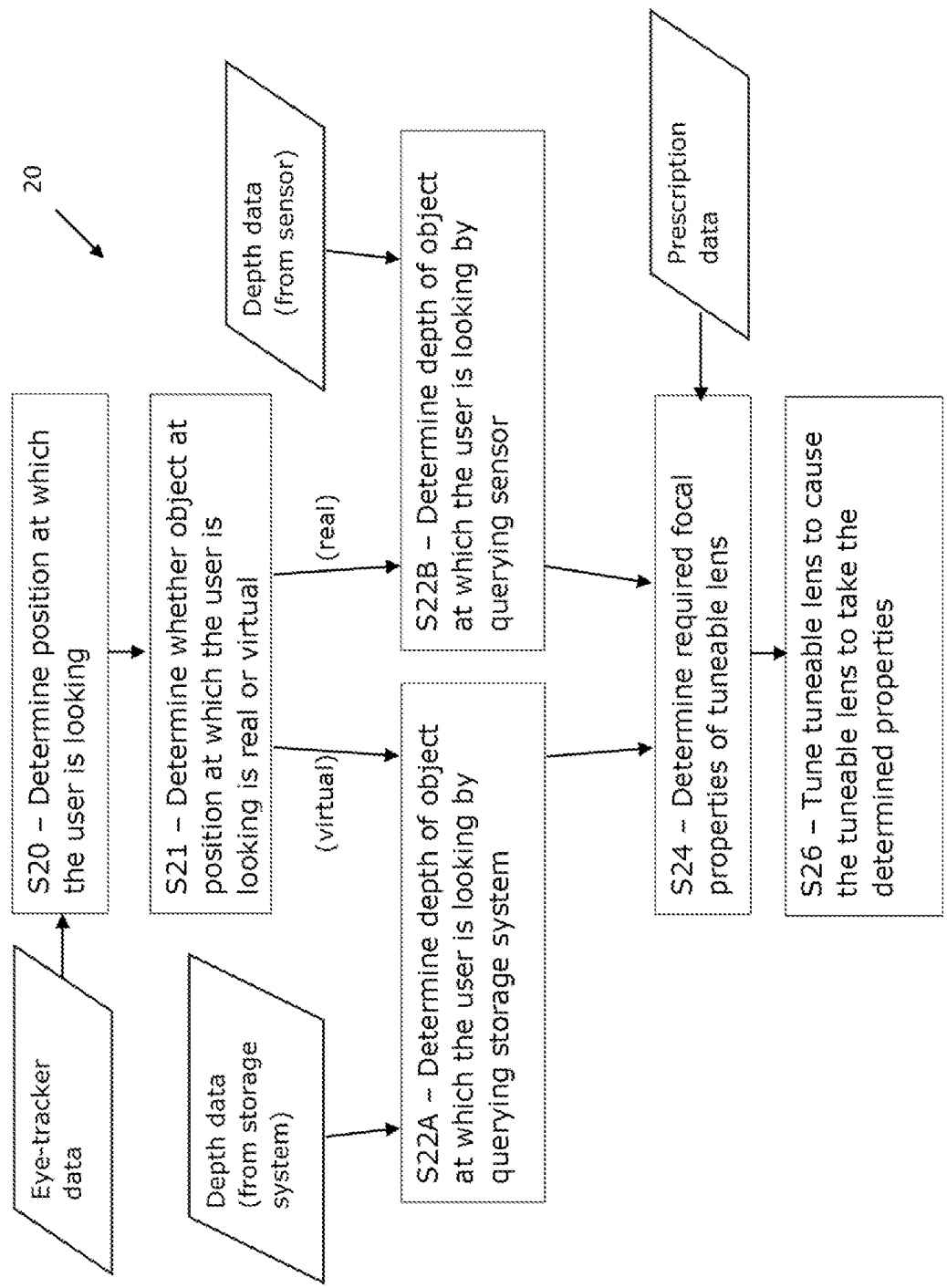
FIG. 5 is a flow diagram of steps according to an embodiment.

Referring to FIG. 5, a method 20 is shown with steps carried out by an apparatus such as apparatus 200. At step S20, processor 202 queries eye-tracker device 204 for eye-tracker data. With the eye-tracker data, which may indicate relative positions and orientations of the user's eyes 214, the processor 202 determines where the user is looking, i.e., determines the object at which the user is looking.

At step S21, the processor 202 determines whether the user is looking at a virtual object being displayed by display 210 or at a real object. If the processor 202 determines that the object at which the user is looking is a virtual object, the method moves to step S22A. If the processor 202 determines that the object at which the user is looking is a real object, the method moves to step S22B.

At step S22A, the processor 202 receives depth data from a storage system, whereby the depth data indicates a depth of the object at which the user is looking in the virtual environment. The depth data may be received from a depth buffer of the storage system.

At step S22B, the processor 202 queries a depth sensor for depth data, which indicates a depth of the object at which the user is looking in the real environment.

Additionally, or alternatively, the processor 202 determines the depth from the eye vergence.

At step S24, knowing how far away the object at which the user is looking is from the user's eyes 214, the processor 202 determines what optical properties tuneable lens 212 must take in order to refract light 216 from the display 210 such that the object at which the user is looking is brought into focus for the user 214. If the object is a real object, the amount may be determined to be zero. At this step, if the user has indicated that they have a prescription for their eyesight, then the processor 202 receives prescription data corresponding to the user's prescription from a prescription storage and takes the user's prescription into account when determining the optical properties of the tuneable lens 212.

At step S26, the processor 202 instructs lens controller 208 to control the tuneable lens 212 to cause the tuneable lens 212 to take the determined properties. The processor 202 may instruct the lens controller 208 to control the tuneable lens 212 to cause the tuneable lens 212 to take the properties globally, i.e., across the whole or majority of the tuneable lens 212, or to take the properties locally, i.e., at a minority portion of the tuneable lens 212 required to bring the object at which the user is looking into focus such that one or more other portions may be tuned to take different properties.

Figure 6:
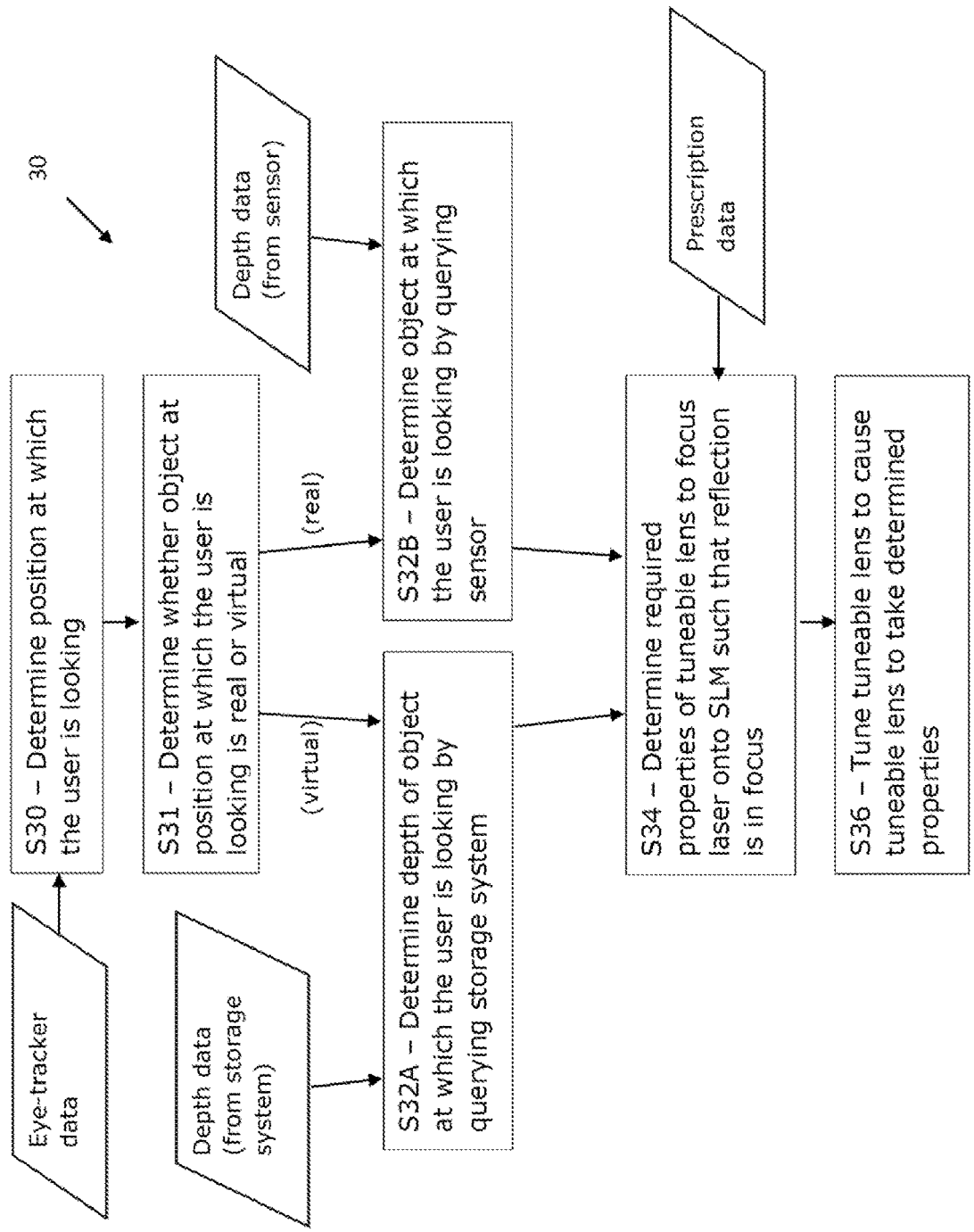
FIG. 6 is a flow diagram of steps according to an embodiment.

Referring to FIG. 6, a method 30 is shown with steps carried out by an apparatus such as apparatus 300. At step S30, processor 302 queries eye-tracker device 304 for eye-tracker data. With the eye-tracker data, which may indicate relative positions and orientations of the user's eyes 314, the processor 302 determines where the user is looking, i.e., determines the object at which the user is looking.

At step S31, the processor 302 determines whether the user is looking at a virtual object whose light is reflected by display 332 or at a real object. If the processor 302 determines that the object at which the user is looking is a virtual object, the method moves to step S32A. If the processor 302 determines that the object at which the user is looking is a real object, the method moves to step S32B.

At step S32A, the processor 302 receives depth data from a storage system, whereby the depth data indicates a depth of the object at which the user is looking in the virtual environment. The depth data may be received from a depth buffer of the storage system.

At step S32B, the processor 302 queries a depth sensor for depth data, which indicates a depth of the object at which the user is looking in the real environment.

Additionally, or alternatively, the processor 302 determines the depth from the eye vergence.

At step S34, on determining how far away the object at which the user is looking is from the user's eyes 314, the processor 302 determines the optical properties tuneable lens 312 must take in order to refract light from the holographic light source 326, incident on the display 332, such that the reflected light 316 corresponding to the object at which the user is looking is brought into focus for the user 314. If the object is a real object, the amount may be determined to be zero. At this step, if the user has previously indicated that they have a prescription for their eyesight, then the processor 302 receives prescription data corresponding to the user's prescription from a prescription storage and takes the user's prescription into account when determining the optical properties of the tuneable lens 312.

At step S36, the processor 302 instructs lens controller 308 to control the tuneable lens 312 to cause the tuneable lens 312 to take the determined properties. The processor 302 may instruct the lens controller 308 to control the tuneable lens 312 to cause the tuneable lens 312 to take the properties globally, i.e., across the whole or majority of the tuneable lens 312, or to take the properties locally, i.e., at a minority portion of the tuneable lens 312 required to focus a portion of the light required to bring the object at which the user is looking into focus such that one or more other portions may be tuned to take different properties.

In any of the methods 10, 20, 30, the processor 102, 202, 302, having determined, received, or otherwise obtained a depth of an object at which the user is looking, may determine optical properties of the tuneable lens 112, 212, 312 required to bring other objects at positions at which the user is not looking out of focus so that they appear blurred while the object at which the user is looking appears sharp.

To mimic the natural behaviour of the eye more closely, and therefore to further reduce or eliminate discomfort caused by the vergence-accommodation conflict, the amount of blurring performed may be proportional to a difference in depth between the object at which the user is looking and the other objects. For example, if the user is using apparatus 100 in an entirely virtual environment in which there is a tree a particular distance (e.g. three metres) away, a car a further distance (e.g. four metres) away, and a building a still further distance (e.g. ten metres) away, and if the user is determined to be looking at the tree, then the processor 102 determines the optical properties of the tuneable lens 112 required to bring the tree into focus, the car slightly out of focus, and the building more out of the focus than the car.

In any of the methods 10, 20, 30, if the user 114, 214, 314 has a prescription (that is, otherwise requires glasses, contact lenses, or the like), then the processor 102, 202, 302 may refer to a prescription storage (not shown) for prescription data to determine necessary optical properties of the tuneable lens 112, 212, 312 such that the tuneable lens 112, 212, 312 mimics a lens of the user's prescription in addition to any other focusing being performed. The prescription storage may store a plurality of prescriptions corresponding to different users. A user may identify themselves to the apparatus 100, 200, 300 when they put on or turn on the apparatus so that the apparatus obtains the appropriate prescription data for that user. Alternatively, the apparatus may automatically recognise the user, such as by using facial recognition, iris recognition, or another known recognition procedure, and obtain the appropriate prescription data accordingly.

In methods 20 and 30, additionally or alternatively to using a depth sensor to obtain depth data of an object, instead the method may obtain one or more images of the environment and infer a depth of the object in the environment from the one or more images using machine learning. The images of the object may be obtained using one or more cameras, which capture light from the environment containing the object and convert the captured light into the least one image of the object. At least one such image may be an RGB image.

As will be appreciated by one skilled in the art, the present techniques may be embodied as an apparatus, system, method, or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. The computer readable storage medium may be a non-transitory computer readable storage medium encoded with instructions that, when performed by a processing means, cause performance of the method described above. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object, or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods, or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

As will be appreciated from the foregoing specification, an apparatus is provided to focus light for a user, comprising a tuneable lens having one or more controllable optical properties, an eye-tracker device to determine a position at which the user is looking, and circuitry to control the one or more optical properties of the tuneable lens to bring an object at the depth of the position into focus for the user. Having a tuneable lens whose properties are adjustable based on depths of positions at which a user of the apparatus is looking to bring objects at that depth into focus enables the replacement of known lenses, which are bulky, heavy, and non-adjustable, with the tuneable lens to reduce bulk and weight and to enable on-the-fly focus adjustment.

Circuitry of the apparatus may control the one or more optical properties of the tuneable lens to bring one or more objects at respective depths of one or more positions at which the user is not looking out of focus for the user. This mimics the user's normal visual experience, thereby improving the user's comfort. The circuitry may bring those objects out of focus in proportion to a difference between the depth of the object at the position at which the user is looking and the depth of the respective one or more objects, which more closely mimics the user's normal visual experience and further improves comfort.

The apparatus may comprise a depth sensor operable to obtain depth data of the object, wherein the circuitry is operable to control the optical properties of the tuneable lens based on the obtained depth. Using a depth sensor improves accuracy of the depth determination. The circuitry may determine a vergence of the user's eyes from eye-tracker data, determine the depth of the position based on the eye vergence, and control the optical properties of the tuneable lens based on the determined depth. Determining the depth using eye vergence obviates the need for a depth sensor.

The apparatus may comprise a display and a display controller to cause an image to be shown on the display.

The apparatus may comprise at least one camera for capturing light from the environment and converting the captured light into at least one image of the environment for display, by the display controller, on the display. This is particularly useful for an apparatus where all or part of the display is opaque.

The display controller may be operable to display a virtual object on the display together with the image of the environment.

The circuitry may determine whether the position at which the user is looking is of a virtual object, and, if so, receive depth data of the virtual object at the position from a storage system and control the one or more optical properties of the tuneable lens based on the received depth. This enables use of the tuneable lens in electronic devices, for example, virtual, augmented, mixed, and extended reality apparatus.

The storage system may comprise a depth buffer.

The display may comprise a spatial light modulator. This allows the tuneable lens to be used in electronic devices such as holographic display apparatus.

The tuneable lens may comprise a metalens. The metalens may comprise optical phase change material. Metalenses can have their optical properties arbitrarily controlled, in a local and global manner, to provide a device which is not only lightweight and slim but also capable of improving user comfort.

The circuitry may be operable to determine that the user is looking at a position which overlaps more than one object, receive an indication of priority of one or more of the overlapping objects, and control the one or more optical properties of the tuneable lens to bring the one or more prioritized objects into focus for the user.

The circuitry may control the optical properties of the tuneable lens to bring the object at the depth of the position at which the user is looking into focus based at least in part on a prescription of the user. This obviates the need for a user to wear their glasses or contact lenses. Further, this allows users with different prescriptions to use the apparatus without requiring them to wear their glasses or contact lenses or having to reconfigure the apparatus, and allows changes to the user's prescription to be easily taken into account by simply updating prescription data.

One or more controllable optical properties of the tuneable lens may be globally controllable.

One or more controllable optical properties of the tuneable lens may be locally controllable.

The apparatus may comprise a head-mounted device or smart glasses.

The apparatus may comprise one or more processors operable to determine the one or more optical properties of the tuneable lens.

As will also be appreciated from the foregoing specification, a method is provided to focus light, comprising determining a position at which the user is looking, and controlling one or more optical properties of a tuneable lens to bring an object at the depth of the position into focus for the user.

The method may comprise comparing a depth from a depth sensor with a depth determined from an eye vergence of the user, and on determining a discrepancy, controlling the one or more properties of the tuneable lens based on the depth determined from eye vergence.

The method may comprise comparing a depth from a depth sensor with a depth determined from an eye vergence of the user, and on determining a discrepancy, receiving depth data from a storage system, comparing the depth data to the depth determined from the eye vergence, and on determining that the depth data and the depth from the eye vergence are within a predetermined margin of one another, controlling the one or more properties of the tuneable lens based on the depth data.

The method may comprise inferring a depth of the object from one or more images of the object using machine learning. The images of the object may be obtained using one or more cameras, which capture light from the environment containing the object and convert the captured light into at least one image of the object.

As will also be appreciated from the foregoing specification, a non-transitory computer-readable storage medium is provided, comprising executable instructions thereon which, if executed by a processor, cause the processor to carry out any methods described above.

What is claimed is:

1. A display apparatus to generate one or more images for a user, comprising:

a display to render one or more images for the user and where the display is at least partially transparent to allow the user view a real environment thought the display;

a tuneable lens arranged between the display and the user having a plurality of locally controllable portions, each locally controllable portion of the tuneable lens comprising metamaterial with optical properties that are controllable to modify bend light passing therethrough from the display to the user by an amount proportional to one or more of applied current and thermal energy to adjust the focus of at least one object in the one or more images on the display for the user;

an eye-tracker device to determine a position on the display at which the user is looking; and circuitry to individually control the one or more optical properties of each locally controllable portion, where the circuitry is to control a first locally controllable portion to bring a first object at the depth of a position at which the user is looking on the display through the lens into focus for the user and to control a second locally controllable portion to bring a second object at a depth of a position at which the user is not looking out of focus for the user, wherein one or both of the first object and second object is a real object or a virtual object, and where a heating device of the circuitry is operable to heat the metamaterial and to control the optical properties of the metamaterial in accordance with the heat supplied by the heating device.

2. The apparatus of claim 1, wherein the circuitry is operable to control the one or more optical properties of the tuneable lens to bring one or more objects at respective depths of one or more positions at which the user is not looking out of focus in proportion to a difference between the depth of the object at the position at which the user is looking and the depth of the respective one or more objects.

3. The apparatus of claim 1, comprising a depth sensor operable to obtain depth data of the object, wherein the circuitry is operable to control the optical properties of the tuneable lens based on the obtained depth.

4. The apparatus of claim 1, wherein the circuitry is operable to determine a vergence of the user's eyes from eye-tracker data, to determine the depth of the position based on the eye vergence, and to control the optical properties of the tuneable lens based on the determined depth.

5. The apparatus of claim 1, comprising a display controller to cause an image to be shown on the display.

6. The apparatus of claim 5, wherein the apparatus comprises at least one camera for capturing light from the environment and converting the captured light into at least one image of the environment for display, by the display controller, on the display.

7. The apparatus of claim 6, wherein the display controller is operable to display a virtual object on the display together with the at least one image of the environment.

8. The apparatus of claim 5, wherein the circuitry is operable to determine whether the position at which the user is looking is of a virtual object, and, if so, to receive depth data of the virtual object at the position from a storage system, and to control the one or more optical properties of the tuneable lens based on the received depth.

9. The apparatus of claim 1, wherein the metalens comprises broadband, transparent, optical phase change material.

10. The apparatus of claim 1, wherein the circuitry is operable to determine that the user is looking at a position which overlaps more than one object, receive an indication of priority of one or more of the overlapping objects, and control the one or more optical properties of the tuneable lens to bring the one or more prioritized objects into focus for the user.

11. The apparatus of claim 1, wherein the circuitry is operable to control the optical properties of the tuneable lens to bring the object at the depth of the position at which the user is looking into focus based at least in part on a prescription of the user.

12. The apparatus of claim 1, wherein one or more controllable optical properties of the tuneable lens is globally controllable.

13. A method of generating one or more images for a user at a display apparatus, the display apparatus having:
 a display to render the one or more images to the user and where the display is at least partially transparent to allow the user view a real environment through the display,
 a tuneable lens arranged between the display and the user having a plurality of locally controllable portions, each locally controllable portion of the tuneable lens comprising metamaterial with optical properties which are controllable to bend light passing from the display to the user by an amount proportional to one or more of applied current and thermal energy to adjust the focus of at least one object in the one or more images for the user viewing the display through the lens,
 an eye-tracker device to determine a position at which the user is looking, and
 circuitry to individually control the one or more optical properties of each locally controllable portion, a heating device of the circuitry operable to heat the metamaterial to control the one or more optical properties of the metamaterial in accordance with the heat supplied by the heating device, the method comprising:
 determining a position on the display at which the user is looking through the lens;
 controlling a first locally controllable portion to bring a first object at the depth of a position at which the user is looking on the display through the lens into focus for the user;
 controlling a second locally controllable portion to bring a second object at a depth of a position at which the user is not looking into focus on the display or out of focus for the user,
 wherein one or both of the first object and second object is a real object or a virtual object.

14. The method of claim 13, comprising comparing a depth from a depth sensor with a depth determined from an eye vergence of the user, and on determining a discrepancy, controlling the one or more properties of the tuneable lens based on the depth determined from eye vergence.

15. The method of claim 13, comprising comparing a depth from a depth sensor with a depth determined from an eye vergence of the user, and on determining a discrepancy, receiving depth data from a storage system, comparing the depth data to the depth determined from the eye vergence, and on determining that the depth data and the depth from the eye vergence are within a predetermined margin of one another, controlling the one or more properties of the tuneable lens based on the depth data.

16. The method of claim 13, comprising inferring a depth of the object from one or more images of the object using machine learning.

17. A non-transitory computer-readable storage medium, comprising executable instructions thereon which, if executed by a processor, cause the processor to carry out the method of claim 13.

* * * * *